United States Patent [19] [11] 4,333,912
Mills et al. [45] Jun. 8, 1982

[54] METHOD FOR DISSOLVING PLUTONIUM-CONTAINING NUCLEAR FUELS

[75] Inventors: Alfred L. Mills, Thurso; Laurence R. Weatherley, Cairneyhill, both of Scotland; John A. Crofts, Dursley, England

[73] Assignee: United Kingdom Atomic Energy Authority, London, England

[21] Appl. No.: 142,736

[22] Filed: Apr. 22, 1980

[30] Foreign Application Priority Data
Apr. 30, 1979 [GB] United Kingdom ................ 7914978
Nov. 7, 1979 [GB] United Kingdom ................ 7938498

[51] Int. Cl.³ .......................... B01F 1/00; C01G 43/02
[52] U.S. Cl. ........................................ 423/20; 423/11; 423/18; 423/251; 252/627
[58] Field of Search ................ 423/20, 18, 251, 11; 252/626, 627

[56] References Cited

U.S. PATENT DOCUMENTS
2,897,047 7/1959 Schulz ................................. 423/20
3,813,464 5/1974 Ayers ................................. 423/20
4,177,241 12/1979 Divins et al. ....................... 423/20

FOREIGN PATENT DOCUMENTS
633313 1/1963 Belgium .............................. 423/20

Primary Examiner—Edward A. Miller
Assistant Examiner—J. J. Zimmerman
Attorney, Agent, or Firm—Larson and Taylor

[57] ABSTRACT

A method of accelerating and increasing the solubility in nitric acid of plutonium dioxide and uranium/plutonium oxide fuels and insoluble residues from such nitric acid dissolution, includes the steps of arranging metal loadings to be at least 200 g (Pu) or (U+Pu) per liter of dissolving solution so that the plutonium in solution acts as an autocatalyst.

3 Claims, 3 Drawing Figures

DISSOLUTION OF 30% PuO₂ FUEL IN 7N HNO₃
EFFECT OF HEAVY METAL LOADING

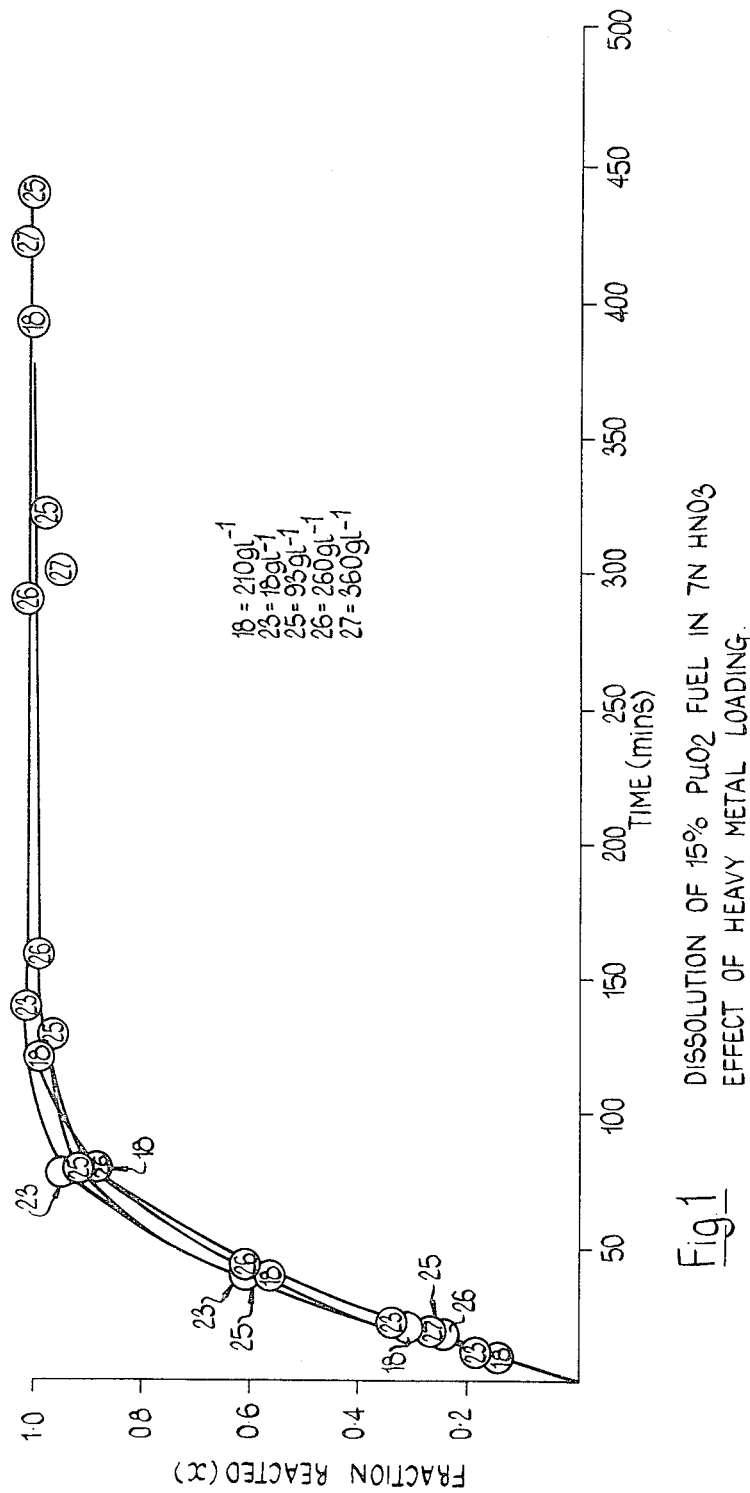

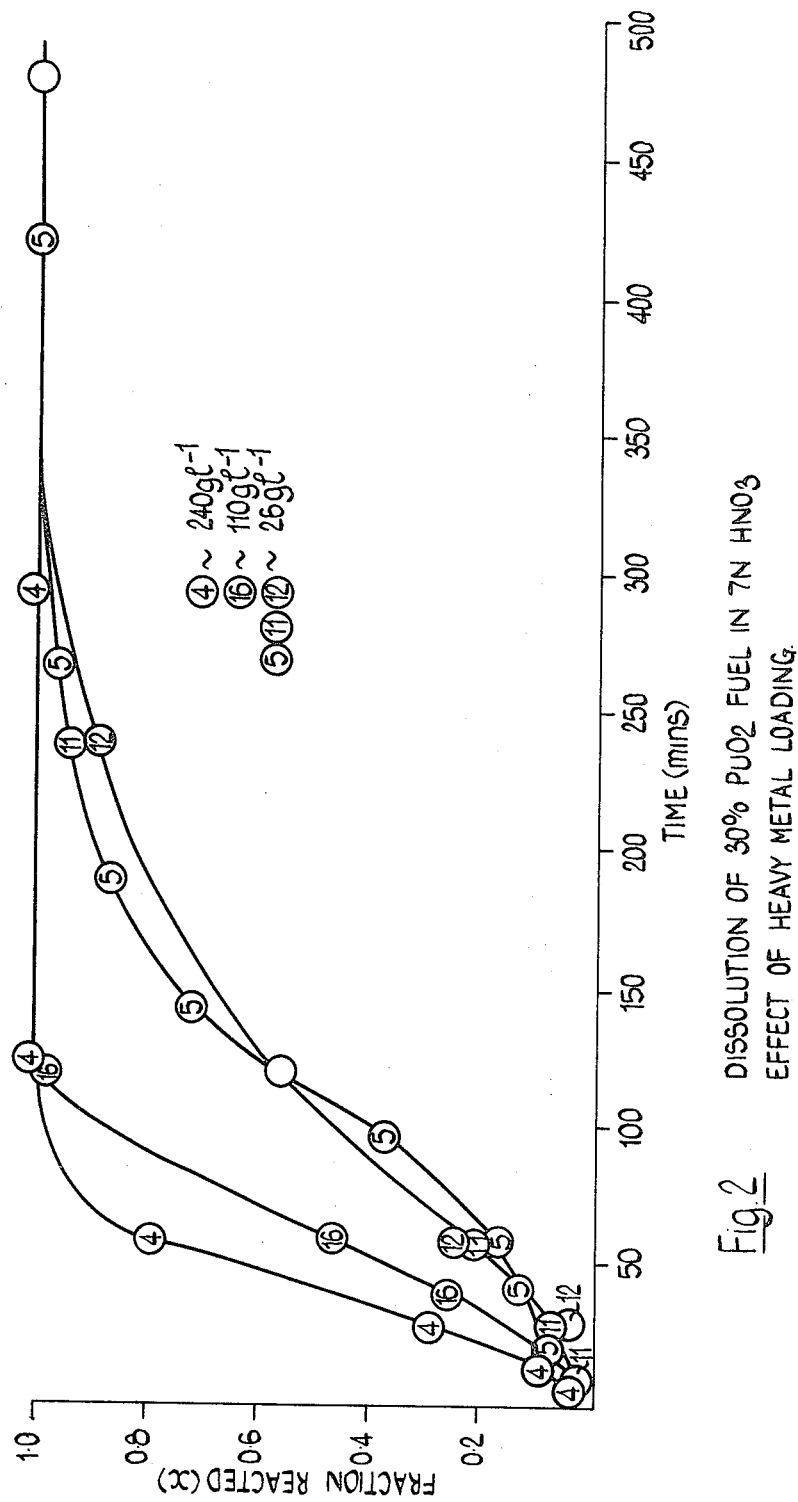

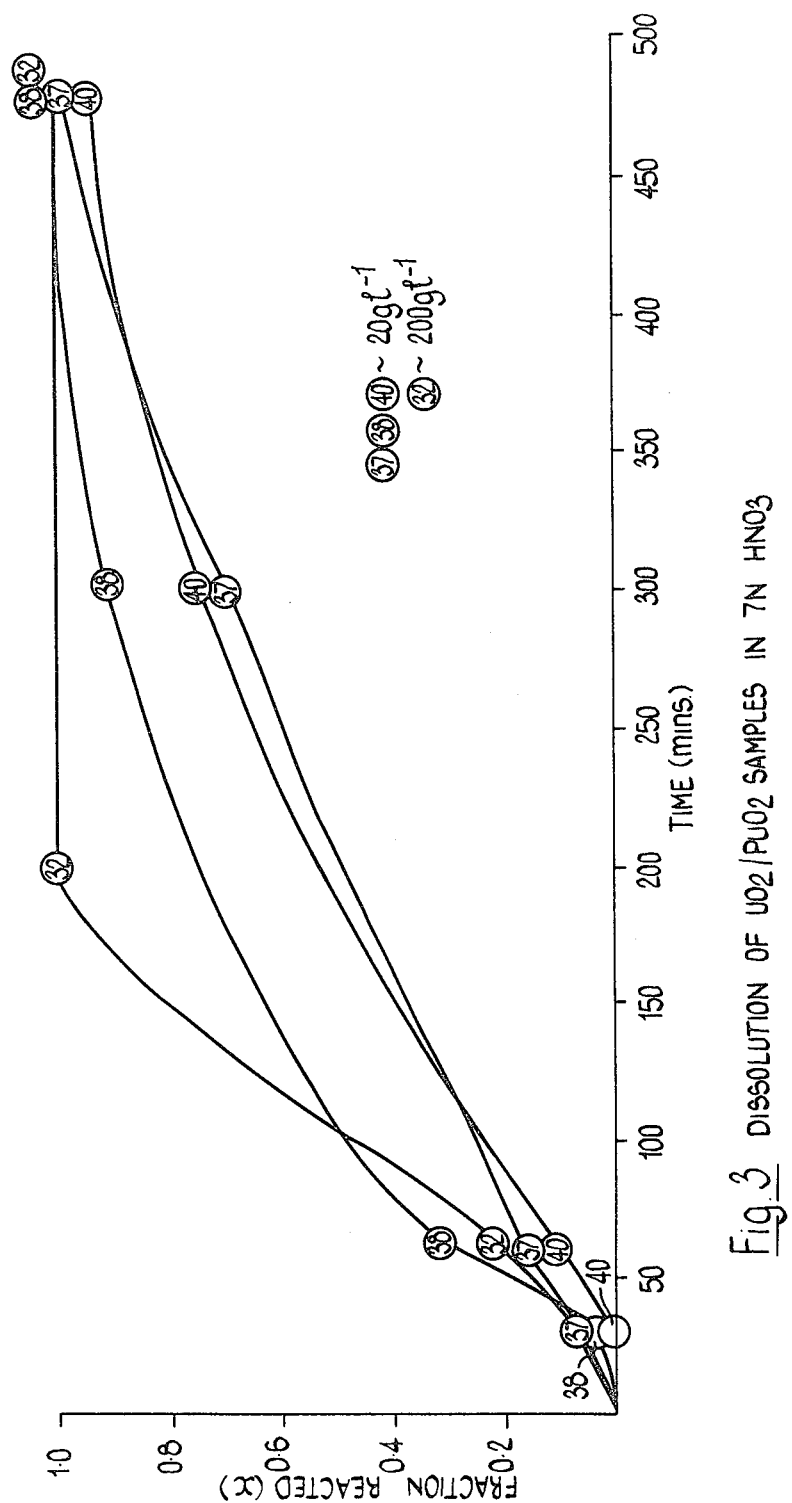

METHOD FOR DISSOLVING PLUTONIUM-CONTAINING NUCLEAR FUELS

The present invention relates generally to the dissolution of plutonium dioxide and plutonium/uranium dioxide fast reactor fuels and residues from the nitric acid dissolution of the latter. The invention is in the context of fast reactor nuclear fuel reprocessing in which it is required to take oxides of uranium and plutonium into solution in nitric acid as a first step in the separation of plutonium, uranium and fission products.

It is known that plutonium dioxide is slowly soluble in nitric acid and mixed uranium/plutonium oxides become more slowly soluble as the plutonium content increases, being impractically slowly soluble at above 40% $PuO_2$. When high plutonium content mixed oxides or inhomogeneous fuels or otherwise poorly manufactured fuels are dissolved in nitric acid, residues may be formed which can in some cases be high in plutonium and in most cases are difficult to dissolve completely.

The slow solubility of plutonium dioxide in nitric acid is a result of the inability of the oxidising nitric acid to oxidise the $Pu^{4+}$ to $Pu^{6+}$ in the solid state. The $Pu^{4+}$ state is more soluble in neutral or reducing environments such as HF and HI respectively. The addition of such corrosive reagents is however most undesirable in large scale nuclear fuel reprocessing plants. The present invention seeks to provide a method of accelerating and increasing the solubility in nitric acid of plutonium dioxide and uranium/plutonium oxide fuels and insoluble residues therefrom without the addition of any extraneous chemicals.

According to the invention, a method of accelerating and increasing the solubility in nitric acid of plutonium dioxide and uranium/plutonium oxide fuels and insoluble residues therefrom, includes the step of ensuring that metal loadings are at least 200 g (Pu) or (U+Pu) per liter of dissolving solution so that the plutonium in solution acts as an autocatalyst.

According to another aspect of the invention, a method as aforesaid may be accomplished by dissolving the solids in nitric acid containing at least 100 g (Pu) per liter as plutonium nitrate which acts as a catalyst.

On a plant scale the plutonium nitrate may be taken from the product stream of a plant for the separation of uranium, plutonium and fission products in irradiated fuel and the process would thus involve the recycling of separated plutonium liquors through the dissolver and solvent extraction vessels. For plutonium dioxide dissolution up to 12 molar nitric acid would be preferable but for mixed oxide dissolution, increasing the acidity above 7 molar has no further beneficial effect.

It is not fully understood how the plutonium nitrate acts as a catalyst but it is postulated that a couple is set up between a $Pu^{4+}$ species of the solid surface and a $Pu^{4+}$ species in solution to form a $Pu^{5+}$ species in solution and a $Pu^{3+}$ species in the solid surface. It is further postulated that this $Pu^{3+}$ species is now inherently more soluble in the oxidising nitric acid than was the $Pu^{4+}$ species, forming $Pu^{4+}$ species in solution which has been observed to be the major plutonium species brought into solution. 'S' shaped rate plots observed for the dissolution of mixed oxides in nitric acid are typical of such autocatalysis.

A problem that may be encountered in the application of this invention is the well established conversion of $Pu^{4+}$ in boiling solution to $Pu^{6+}$. This may be overcome by either of two means:

a. The extent of conversion of $Pu^{4+}$ to $Pu^{6+}$ is decreased by high acidity. Thus the dissolution should always be carried out in 7 molar nitric acid or stronger (initial acidity). Lower starting acidities may lead to poor solubility.

b. The continuous regeneration of $Pu^{4+}$ may be effected by circulating a fraction of the dissolver solution through a suitable electrolytic cell or through a limb into which is introduced a reductant such as gaseous nitric oxide which reduces $Pu^{6+}$ to $Pu^{4+}$.

BRIEF DESCRIPTION OF THE DRAWING

The invention will be better understood from the accompanying drawings which are graphs of "fraction reacted" against "time" for various metal loadings:

FIG. 1 illustrates the effect of heavy metal loading in the dissolution of 15% $P_uO_2$ fuel in 7 N $HNO_3$.

FIG. 2 illustrates the effect of heavy metal loading in the dissolution of 30% $P_uO_2$ fuel in 7 N $HNO_3$.

FIG. 3 illustrates the dissolution rate of $UO_2/P_uO_2$ samples in 7 N $HNO_3$.

EXAMPLE 1

Experiments have been carried out to investigate the solubility of sintered plutonium dioxide in nitric acid of various strengths containing various amounts of plutonium nitrate. Samples were refluxed (110° C.) for six hours and the percentage of the plutonia dissolved was as follows:

12 M $HNO_3$: 1.1%
Fuming $HNO_3$: 0.04%
6.5 M $HNO_3$/0.42 M $Pu(NO_3)_4$: 3.9%
12 M $HNO_3$/0.042 M $Pu(NO_3)_4$: 4.25%
12 M $HNO_3$/0.42 M $Pu(NO_3)_4$: 19.6%

The maximum rate was obtained in the higher acidity and higher plutonium catalyst concentration.

EXAMPLE 2

Various weights of experimentally produced unirradiated uranium/plutonium dioxide fast reactor fuel pellets, both 15 and 30% $PuO_2$, were refluxed in 50 cm$^3$ of 7 molar nitric acid to produce various final metal loadings. The results are illustrated by FIGS. 1 and 2. The specific rate of dissolution of the 15% $PuO_2$ material was independent of the metal loading of the solution. The 30% $PuO_2$ material is inherently more slowly soluble at 20 g (U+Pu)l$^{-1}$ but as the metal loading, and hence the plutonium content of the solution, was increased the specific rate of dissolution of the mixed oxide was autocatalysed by the $Pu^{4+}$ species in solution. Dissolution to 200 g (U+Pu)l$^{-1}$ was catalysed for 30% $PuO_2$ material to such an extent that the rate of dissolution was equal to that for the inherently more soluble 15% $PuO_2$ material.

EXAMPLE 3

Samples of current Windscale fast reactor fuel production line unirradiated uranium/plutonium dioxide fuel pellets were dissolved in 50 cm$^3$ of 7 molar nitric acid to various final heavy metal loadings. Dissolution to a higher metal loading produced a higher specific rate of dissolution as shown in FIG. 3 which is also a graph of 'fraction reacted' against time.

EXAMPLE 4

10 g samples of mixed oxide fuel (30% $PuO_2/UO_2$) from a fast reactor fuel manufacturing batch were dissolved in 50 cm$^3$ of nitric acid containing various amounts of plutonium nitrate and the residues remaining after an 8 h reflux were as follows:

8 M $HNO_3$: 15.7%

7 M $HNO_3$: 30.4%

8 M $HNO_3$/100 g $1^{-1}$ $Pu(NO_3)_4$: 1.7%

8 M $HNO_3$/100 g $1^{-1}$ $Pu(NO_3)_4$: 0.25%

8 M $HNO_3$/60 g $1^{-1}$ $Pu(NO_3)_4$: 5.5%

The presence of plutonium in the solution is seen to catalyse the dissolution of this poorly soluble fuel batch.

We claim:

1. A method of increasing the dissolution rate in nitric acid of plutonium dioxide and uranium/plutonium oxide fuels and insoluble residues therefrom comprising conducting said disolution in at least 7 molar nitric acid having metal loadings of Pu or U+Pu maintained at at least 200 g per liter of nitric acid.

2. A method according to claim 1 wherein the metal loading is provided by the addition of plutonium nitrate.

3. A method according to claim 2 wherein the plutonium nitrate is provided by recycling to said dissolution plutonium liquors from a plant for the separation of uranium, plutonium and fission products.

* * * * *